United States Patent [19]
Houshar

[11] 3,873,146
[45] Mar. 25, 1975

[54] TETHER RELEASE DEVICE

[75] Inventor: Glen Nicholas Houshar, San Diego, Calif.

[73] Assignee: Campbell Industries, San Diego, Calif.

[22] Filed: Apr. 17, 1974

[21] Appl. No.: 461,611

[52] U.S. Cl. ................................ 294/83 R, 294/84
[51] Int. Cl. ............................................. B66c 1/38
[58] Field of Search ............... 294/83 R, 84, 75, 88; 24/232; 114/230

[56] References Cited
UNITED STATES PATENTS

| | | | |
|---|---|---|---|
| 1,377,159 | 5/1921 | Spechtmeier | 294/84 |
| 2,426,099 | 8/1947 | Hershowitz | 294/84 |
| 3,259,418 | 7/1966 | Munday et al. | 294/83 R |
| 3,610,674 | 10/1971 | Janssen | 294/75 |
| 3,811,720 | 5/1974 | Epstein | 294/83 R |

Primary Examiner—Richard A. Schacher
Assistant Examiner—Jeffrey V. Nase
Attorney, Agent, or Firm—Brown & Martin

[57] ABSTRACT

A device to release and recapture a tether under load incorporating a frame with a tether restraining notch. The notch cooperates with a trigger and entraps a tether. The load is carried through the frame. For release, the trigger lifts the tether out of engagement with the frame and provides a disengagement path so that the tether may be drawn out of the tether restraining notch.

6 Claims, 5 Drawing Figures

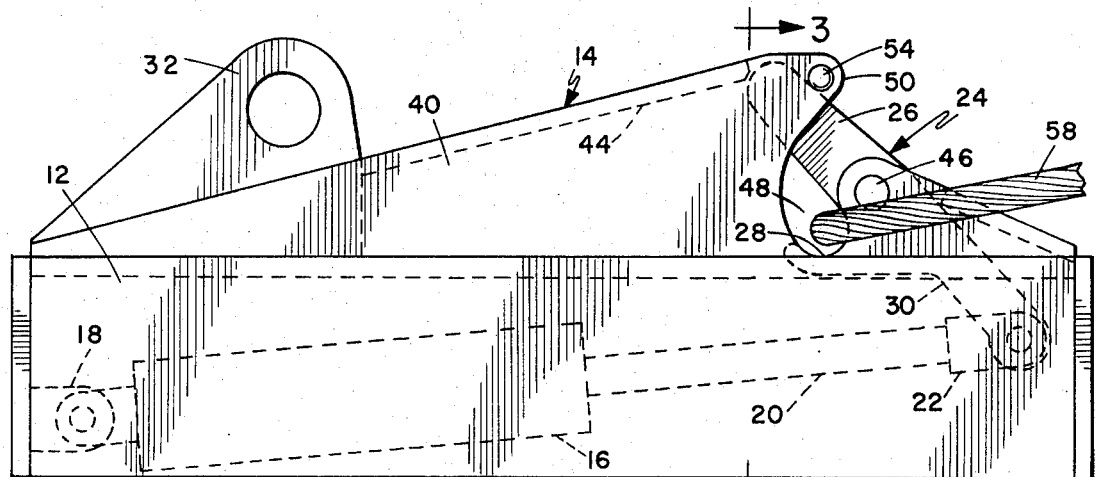
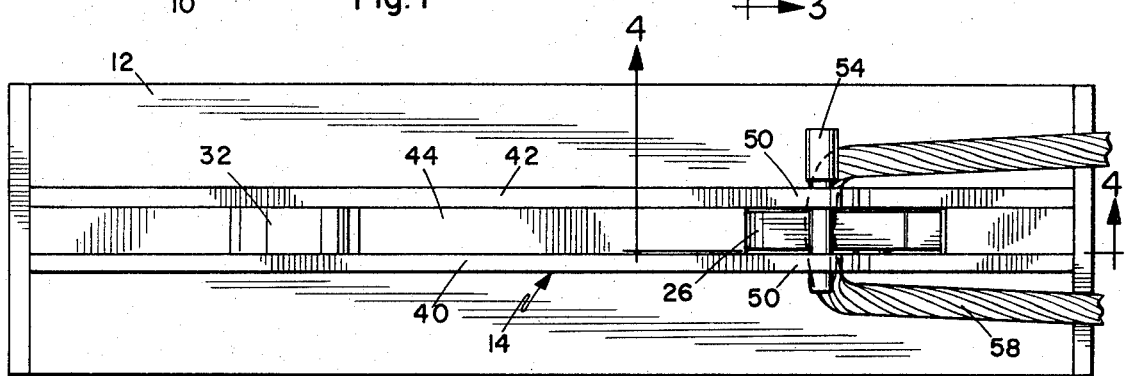
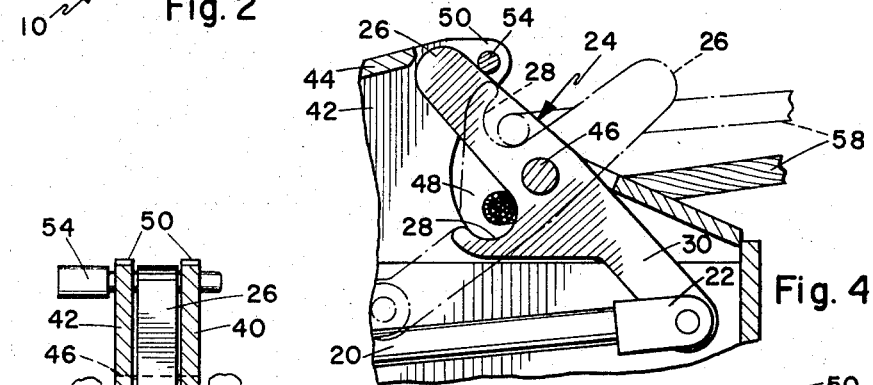
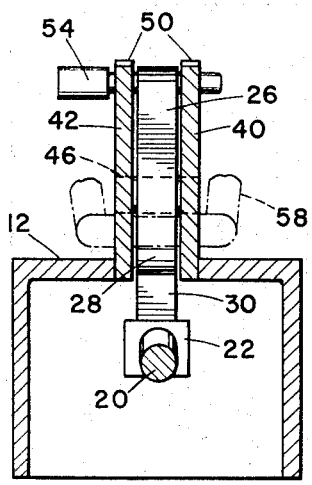
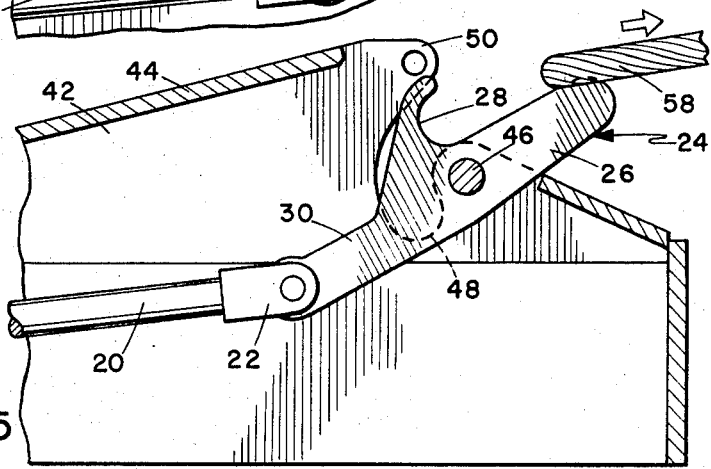

3,873,146

TETHER RELEASE DEVICE

BACKGROUND OF THE INVENTION

In many applications where it is necessary to secure and release a heavy load, such as in towing of vessels and in the launching and stowing of a net skiff in tuna fishing operations, it is necessary to provide a device for releasing a load while tension is on the mechanism. By conventional practice the usual device employed for this purpose is a pelican hook. The pelican hook incorporates a main link and a latch member pivoted on the main link. The load is carried between the main link and the latch member. The latch is held in position by a latch link that is slid over the latch member and held in position on the latch member by a pin.

In releasing a load carried by a pelican hook it is necessary to have one or more workmen manually free the pin and remove it, and then to strike the latch link so that it moves along the main link and clears the latch member. At the instant the latch link clears the latch member, the latch member is pivoted under the force of the load until it substantially aligns with the main link and thereby releases the load. Depending on the tension of the load this latch link moves rearwardly with great force and then may rebound forwardly with the concomitant possibility of injury to the workmen. Additionally, the initial movement of the latch link upwardly may impact the hammer or other implement employed by the workmen and thereby project the hammer toward the workmen. The re-attachment of the load is similarly difficult to accomplish and frequently requires two or more workmen who manually set the pelican hook and re-secure the latch link and pin. In the application of a pelican hook to the securing of a net skiff in a tuna seiner the operation normally requires one workman to hold the pennant from the net skiff, another workman to hold the pelican hook, and a third to actuate the latch on the pelican hook.

Thus it is desirable to have a tether release device that operates without human assistance and which is remotely controlled for both the release and re-engagement of a tether.

SUMMARY OF THE INVENTION

In an exemplary embodiment of the invention a frame incorporates a tether restraining notch. The tether is held within the notch by a trigger means so that the force on the tether is absorbed by the frame. The trigger means pivots on the frame between tether restraining and tether release positions. Whereas it is within the teachings of the invention to provide a trigger and notch combination which restrain the tether over any range of load pul directions in excess of 180°, in the exemplary embodiment the tether is restrained over 360° by the incorporation on the frame of a tether entrapment lug means. The trigger is pivoted from the restraining to the release position under the influence of a remotely actuated hydraulic cylinder. A safety pin inserted through the frame at the entrapment lug means portion thereof, is capable of restraining the trigger from movement to prevent inadvertant release of the tether by inadvertant actuation of the hydraulic cylinder. In normal actuation a hydraulic check valve in the hydraulic system prevents trigger movement.

It is therefore an object of the invention to provide a new and improved tether release device.

It is another object of the invention to provide a new and improved tether release device which is relatively simple in construction.

It is another object of the invention to provide a new and improved tether release device which is capable of carrying relatively high tether loads.

It is another object of the invention to provide a new and improved tether release device wherein the tether is lifted out of engagement with the load carrying structure.

It is another object of the invention to provide a new and improved tether release device with a safety lock to prevent inadvertant actuation.

It is another object of the invention to provide a new and improved tether release device that reduces the possibility of injury from the release of a load.

It is another object of the invention to provide a new and improved tether release device that reduces the labor requirement for load release and load re-engagement.

Other objects and many attendant advantages of the invention will become more apparent upon a reading of the following detailed description together with the drawings in which like reference numerals refer to like parts throughout, and in which:

FIG. 1 is a side elevation view of the release device in the tether restraining position with the safety lock engaged.

FIG. 2 is a top plan view of the device.

FIG. 3 is a sectional view taken on line 3-3 of FIG. 1.

FIG. 4 is a sectional view taken on line 4-4 of FIG. 2.

FIG. 5 is a sectional view similar to FIG. 4 but with the mechanism in a tether release position.

Referring now to the drawing there is illustrated a tether release device 10. The device includes a frame made up of a base portion 12 and a side frame portion 14. A hydraulic cylinder 16 is carried within the base portion and has its cylinder end mounted for pivotal movement around bearing 18. The piston 20 of the hydraulic cylinder is pivotally connected to trigger means 24 by a clevis 22. The trigger means 24 includes a tether restraining portion 26, a tether lift portion 28 and an actuating arm portion 30. A pad eye 32 is carried on the base portion of the frame for purposes which will become apparent hereinafter.

The side frame portion 14 of the base 12 is made up of two generally planar vertical side frames 40 and 42. The side frames are secured together through a cross member 44. A pivot pin 46 is carried between the side frame members, supports the trigger means 24 for pivotal movement. A tether entrapment lug means 50 projects from the side frames 40 and 42. Between the lug means 50 and the pivot 46 is a tether restraining notch 48. The notch 48 forms a generally arcuate slot. The side of the slot adjacent the pivot 46 corresponds generally to the circumference of a circle with an axis about the pivot 46.

In FIGS. 1 and 2 the tether is illustrated as being a loop of cable 58. Cable 58 is restrained within the tether restraining notch 48. At the illustrated load pull direction the tether is being carried primarily on the side frames 40 and 42 adjacent the pivot 46. The trigger means 24 is locked in position by the insertion of the safety lock pin 54 through holes in the tether entrapment lug means 50.

Referring now to FIGS. 4 and 5 the process of releasing the tether is illustrated. In FIG. 4 solid line position of the trigger means 24 is identical to that in FIG. 1, however, the dotted line segment indicates the action of the trigger upon actuation of the hydraulic cylinder 16. Upon actuation of the device the tether lift portion 28 of the trigger engages the cable 58 and begins to lift the cable over center of the side frame member adjacent the pivot 46. When the angle of pull of the tether is sufficient to draw it up and over the end of the trigger 24, the cable is released and is pulled clear of the trigger as is illustrated in FIG. 5.

OPERATION

In use, the device as employed on a tuna seiner is secured on the stern of the seiner spaced from the net loading area. The net skiff is carried on the net after the net is placed on the stern of the vessel. Thus the skiff is somewhat higher than the tether release device. The skiff will slide off of the net unless restrained. Therefore, when the skiff is pulled onto the vessel by the ships winch, a pennant, which is secured to the skiff and has a ring attached to one end thereof, is drawn into the vicinity of the tether release device. The device is in an open position, such as is illustrated in FIG. 5. The ring of the pennant is placed over the trigger and into the entrance to the tether restraining notch. Upon an indication from the workers holding the ring that the device is ready for actuation, the captain actuates the hydraulic cylinder 16 causing the trigger to rotate into its tether restraining position, such as is illustrated in FIG. 1. Check valves in the hydraulic system prevent the reverse actuation of the trigger 26 until it is desired to release the device. As a further safety latching mechanism, the safety lock pin 54 is inserted through the tether entrapment lug means to prevent the trigger from moving. Should the hydraulic system be inadvertantly actuated with the safety lock pin in place a hydraulic over-pressure valve would bypass the pumped hydraulic fluid to prevent damage to the system. In case it is desirable to use a conventional pelican hook for any reason, the positioning of pad eye 32 makes it possible to insert the pelican hook without change in pennant length.

When it is desired to release the skiff, the safety lock pin is removed and the area cleared to prevent any possible injury from the release pennant and ring. After the captain is assured that the area is clear he actuates the hydraulic cylinder 16 in the reverse direction, to move the trigger toward the open position. The load pull of the skiff draws the ring out of the tether release notch and the skiff is allowed to slide off of the net and to thereby be launched and ready for use.

Having described my invention, I now claim:

1. In a device for controlably restraining and releasing a load attached to a tether, comprising:
   a frame,
   trigger means carried on a pivot bearing on said frame for pivotal movement between tether restraining and tether release positions, means for pivoting said trigger means between said tether restraining and tether release positions,
   a tether restraining notch in said frame spaced from said pivot bearing,
   said trigger means in said tether restraining position and said tether restraining notch prevent the release of said tether over a range of tether pull directions in excess of 180° about an axis parallel to the axis of said bearing,
   said trigger means includes a tether lift means for lifting a tether free of the restraint of said tether restraining notch.

2. The device claimed in claim 1, wherein;
   a portion of said frame comprises a tether entrapment lug means for preventing a tether from being withdrawn from said notch in any direction when said trigger is in said tether restraining position.

3. The device claimed in claim 2, wherein;
   said tether entrapment lug means includes alligned holes, and a
   safety lock pin means for engagement with said aligned holes and preventing movement of said trigger means from said tether restraining position.

4. The device as claimed in claim 1, wherein;
   said frame comprises two substantially planar vertically oriented side frames spaced from one another,
   said trigger is carried on said pivot bearing between said side frames.

5. The device claimed in claim 1, wherein;
   said trigger includes an actuating arm,
   said actuating arm being pivotally connected to an end of a hydraulic cylinder,
   the opposite end of said hydraulic cylinder being connected to said frame.

6. The device claimed in claim 1, wherein;
   said tether restraining notch comprises an arcuate slot having a side adjacent said pivot that corresponds to the circumference of a circle having a center on said pivot.

* * * * *